(12) United States Patent
Klausen et al.

(10) Patent No.: US 10,362,006 B2
(45) Date of Patent: Jul. 23, 2019

(54) SYSTEMS AND METHODS FOR CRYPTOGRAPHIC SECURITY AS A SERVICE

(71) Applicant: MasterCard International Incorporated, Purchase, NY (US)

(72) Inventors: Mark A. Klausen, O'Fallon, MO (US); Christopher Guthrie, Kirkwood, MO (US); Thomas Arthur Roewe, Jr., Belleville, IL (US); Brian Loeffler, Wright City, MO (US); Vivek Kosuri, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 13/838,995

(22) Filed: Mar. 15, 2013

(65) Prior Publication Data
US 2014/0281487 A1 Sep. 18, 2014

(51) Int. Cl.
*H04L 29/06* (2006.01)
*G06F 21/60* (2013.01)

(52) U.S. Cl.
CPC ........ *H04L 63/0471* (2013.01); *G06F 21/602* (2013.01); *H04L 63/04* (2013.01); *H04L 63/06* (2013.01)

(58) Field of Classification Search
CPC ......... G06F 21/24; G06F 21/602; H04L 9/32; H04L 63/0471; H04L 63/06; H04L 63/04
USPC ....... 713/152, 153, 161, 165, 171, 176, 189, 713/150; 380/277, 278
See application file for complete search history.

(56) References Cited

U.S. PATENT DOCUMENTS

| | | | |
|---|---|---|---|
| 7,035,405 | B1 | 4/2006 | Schwenk |
| 7,725,723 | B2 | 5/2010 | Landrock et al. |
| 7,925,023 | B2 | 4/2011 | Youn et al. |
| 7,979,569 | B2 | 7/2011 | Eisner et al. |
| 8,078,879 | B2 | 12/2011 | Landrock et al. |
| 8,336,079 | B2 | 12/2012 | Budko et al. |

(Continued)

FOREIGN PATENT DOCUMENTS

| | | |
|---|---|---|
| WO | 2008-089276 A2 | 7/2008 |
| WO | 2010-150008 A2 | 12/2010 |

OTHER PUBLICATIONS

PCT/US2014/017782 International Search Report and Written Opinion dated May 29, 2014 (13 pages).

*Primary Examiner* — Kevin Bechtel
*Assistant Examiner* — Quazi Farooqui
(74) *Attorney, Agent, or Firm* — Armstrong Teasdale LLP

(57) ABSTRACT

A system and a computer-based method for providing bundled services to a client application in a service call to a service system in a service provider computer system includes receiving a message defining an API service request comprising at least a parameter portion and a payload portion, determining at the gateway system an identity of an application transmitting the received message using identity information that has been established within the service provider computer system, providing, by a services platform, at least one of encryption services and decryption services for data contained in the payload portion using the parameters received in the parameter portion, managing key material for security of the data, and transmitting the encrypted data back to the calling application.

20 Claims, 9 Drawing Sheets

(56) References Cited

U.S. PATENT DOCUMENTS

| | | |
|---|---|---|
| 2003/0236987 A1 | 12/2003 | Griffin et al. |
| 2005/0010758 A1 | 1/2005 | Landrock et al. |
| 2006/0149962 A1 | 7/2006 | Fountain et al. |
| 2007/0118749 A1 | 5/2007 | Hagn et al. |
| 2007/0124439 A1 | 5/2007 | Shah et al. |
| 2008/0019527 A1 | 1/2008 | Youn et al. |
| 2008/0172713 A1 | 7/2008 | Kamendje et al. |
| 2009/0106550 A1* | 4/2009 | Mohamed .............. H04L 63/045 713/156 |
| 2009/0276828 A1 | 11/2009 | Swander et al. |
| 2010/0191977 A1 | 7/2010 | Landrock et al. |
| 2010/0278331 A1 | 11/2010 | Walker et al. |
| 2011/0126264 A1 | 5/2011 | Dunstan |
| 2012/0131354 A1* | 5/2012 | French ................... G06F 21/602 713/189 |
| 2012/0179913 A1* | 7/2012 | Kirk et al. .................... 713/176 |
| 2012/0311321 A1 | 12/2012 | Landrock et al. |
| 2013/0019282 A1 | 1/2013 | Rice et al. |
| 2013/0208893 A1* | 8/2013 | Shablygin et al. ........... 380/277 |
| 2014/0025959 A1* | 1/2014 | Dittrich ........................ 713/189 |
| 2014/0270153 A1* | 9/2014 | Scarpino ............... H04L 9/0637 380/28 |

\* cited by examiner

SYSTEMS AND METHODS FOR CRYPTOGRAPHIC SECURITY AS A SERVICE

BACKGROUND OF THE INVENTION

This invention relates generally to providing bundled services to user applications having access to a computer system through an open application programming interface (API) and, more particularly, to network-based methods and systems for providing security and other services for software applications that are granted access to a service provider computer system through application calls in an open API architecture.

There are service provider companies that provide a variety of services to numerous consumers. These service provider companies utilize computer systems to provide these services. For example, in the financial industry, companies such as large banks, interchange networks and payment networks provide certain financial services to consumers, companies and other banks. Oftentimes, these service provider companies provide services that include receiving, processing and storing financial data in computer systems managed by the service provider or other companies.

Software developers around the world are able to develop computer programs, sometimes called applications that are configured to utilize data such as the data stored within computer systems used by certain service provider companies. Of course, in order for these computer programs to use such data, the developer programs must be able to access the data. One way to access the data stored by these service provider companies is through an open application programming interface (API).

Additionally, such applications may have security issues in that data collected on their websites may be sensitive personal data that must be protected. Managing security for data from a website is often complex, time-consuming and expensive. Logins and passwords must be managed, data may need to be encrypted and decrypted, generating keys, which must be managed, and digital signatures may also be used, which must be managed as well.

BRIEF DESCRIPTION OF THE INVENTION

In one embodiment, a computer-based method for providing bundled services to a client application in a service call to a service system in a service provider computer system includes receiving a message defining an API service request comprising at least a parameter portion and a payload portion, determining at the gateway system an identity of an application transmitting the received message using identity information that has been established within the service provider computer system, providing, by a services platform, at least one of encryption services and decryption services for data contained in the payload portion using the parameters received in the parameter portion, managing key material for security of the data, and transmitting the encrypted data back to the calling application.

In another embodiment, a computer system for processing client application service calls, the computer system includes a memory device and a processor in communication with the memory device and the computer system is programmed to receive a message defining an API service request comprising at least a parameter portion and a payload portion, determine at the gateway system an identity of an application transmitting the received message using identity information that has been established within the service provider computer system, provide, by a services platform, at least one of encryption services and decryption services for data contained in the payload portion using the parameters received in the parameter portion, manage key material for security of the data, and transmit the encrypted data back to the calling application.

In yet another embodiment, one or more non-transitory computer-readable storage media has computer-executable instructions embodied thereon, wherein when executed by at least one processor, the computer-executable instructions cause the processor to receive a message defining an API service request comprising at least a parameter portion and a payload portion, determine at the gateway system an identity of an application transmitting the received message using identity information that has been established within the service provider computer system, provide, by a services platform, at least one of encryption services and decryption services for data contained in the payload portion using the parameters received in the parameter portion, manage key material for security of the data, and transmit the encrypted data back to the calling application.

BRIEF DESCRIPTION OF THE DRAWINGS

FIG. 1 is a schematic diagram illustrating an exemplary multi-party transaction card industry system for enabling ordinary payment-by-card transactions in which merchants and card issuers do not need to have a one-to-one special relationship.

FIG. 2 is a simplified block diagram of an exemplary processing system including a plurality of computer devices in accordance with one embodiment of the present invention.

FIG. 3 is an expanded block diagram of an exemplary embodiment of a server architecture of a processing system including other computer devices in accordance with one embodiment of the present invention.

FIG. 4 illustrates an exemplary configuration of a user system operated by a user, such as the cardholder shown in FIG. 1.

FIG. 5 illustrates an exemplary configuration of a server system such as the server system shown in FIGS. 2 and 3.

FIG. 6 illustrates a data flow diagram of a security services system in accordance with an exemplary embodiment of the present disclosure.

FIG. 7 is a block diagram of the centralized web services platform shown in FIG. 6 in accordance with an exemplary embodiment of the present disclosure.

FIG. 8 is a flow diagram of a method of handling a call for services from the centralized web services platform shown in FIG. 6 by an application in accordance with an exemplary embodiment of the present disclosure.

FIG. 9 is a block diagram of the centralized web services platform shown in FIG. 6 illustrating platform components in accordance with an exemplary embodiment of the present disclosure.

DETAILED DESCRIPTION OF THE INVENTION

Embodiments of the methods and systems described herein relate to providing crucial data security functionality and confidentiality to meet certain requirements for business applications using an easy to use services based model.

The following detailed description illustrates embodiments of the invention by way of example and not by way of limitation. It is contemplated that the invention has general application to providing data security and financial services as a revenue business in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present invention are not intended to be interpreted as excluding the existence of additional embodiments that also incorporate the recited features.

Figure 1:
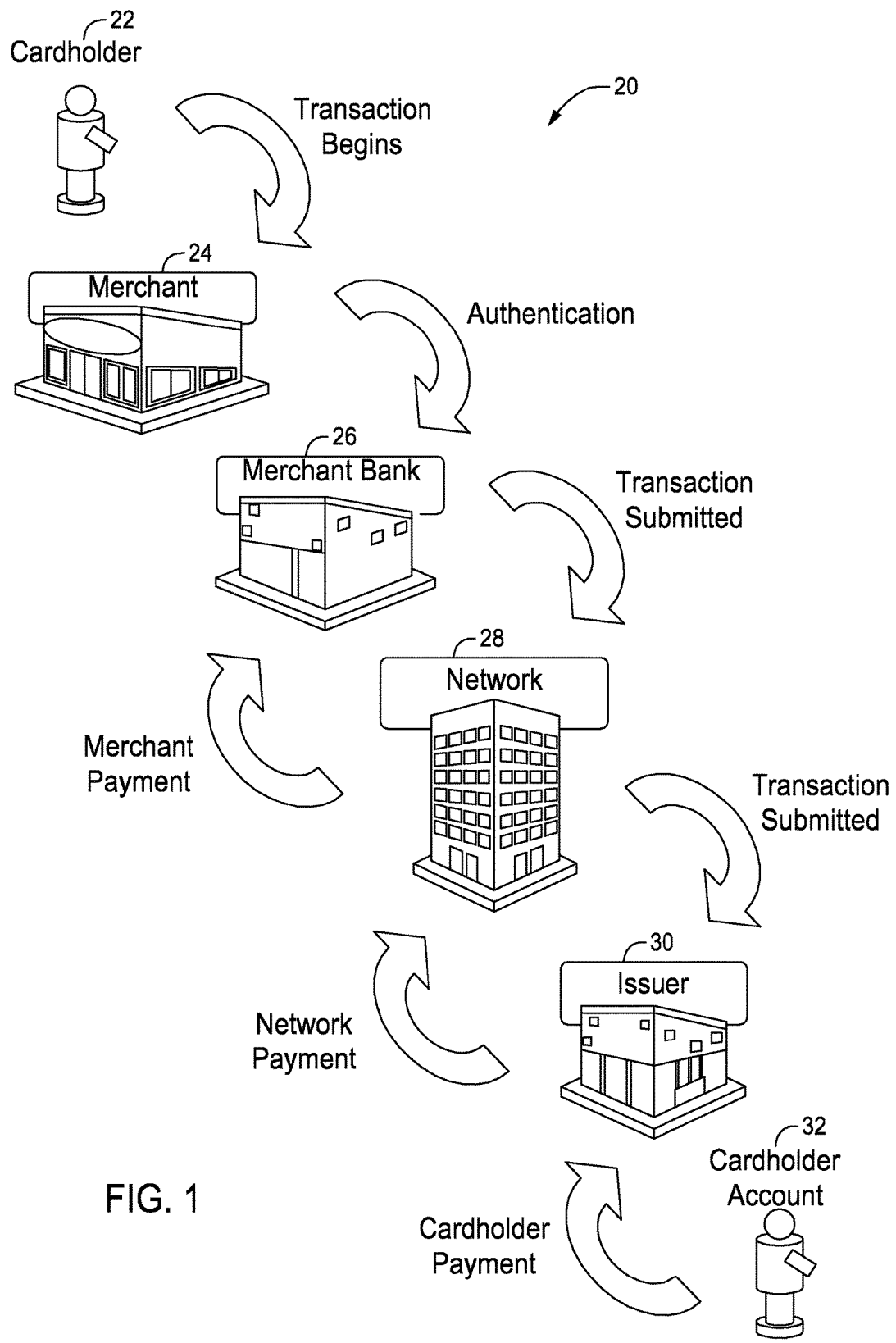
FIGS. 1-9 show exemplary embodiments of the methods and systems described herein.

FIG. 1 is a schematic diagram illustrating an exemplary multi-party transaction card industry system 20 for enabling ordinary payment-by-card transactions in which merchants 24 and card issuers 30 do not need to have a one-to-one special relationship. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the exemplary embodiment, when cardholder 22 purchases travel, such as airfare, a hotel stay, and/or a rental car, at least partial itinerary information is transmitted during the clearance process as transaction data. When interchange network 28 receives the itinerary information, interchange network 28 routes the itinerary information to database 120.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

Figure 2:
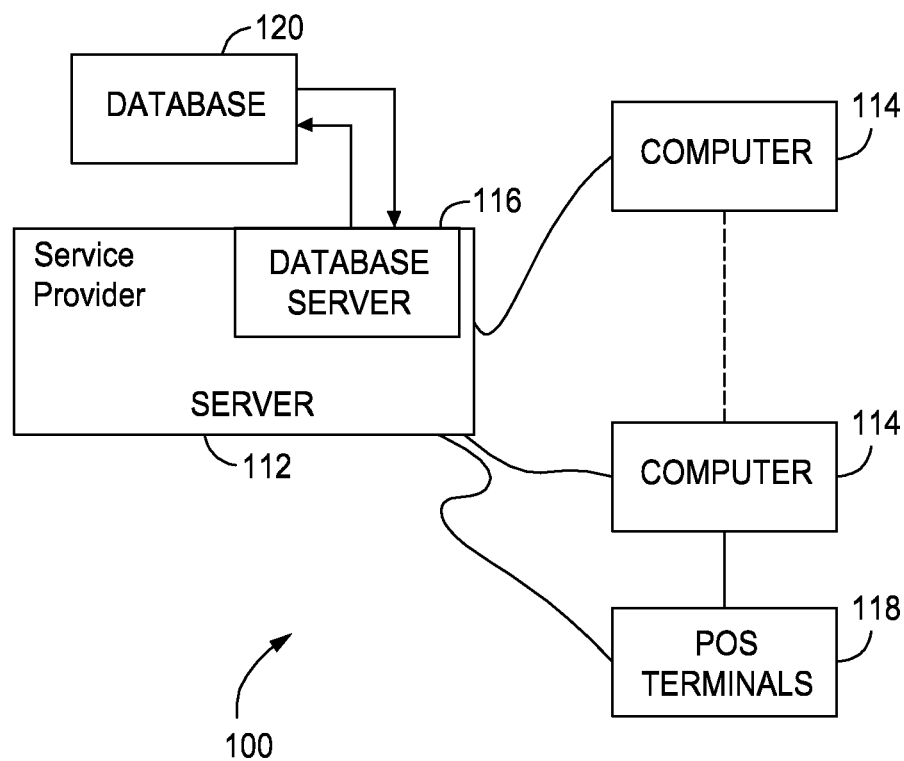

FIG. 2 is a simplified block diagram of an exemplary processing system 100 including a plurality of computer devices in accordance with one embodiment of the present invention. In the example embodiment, system 100 may be used for performing payment-by-card transactions and/or interfacing with applications that make security services calls for providing key management and other services to the application.

More specifically, in the example embodiment, system 100 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed Integrated Services Digital Network (ISDN) lines. Client systems 114 could be any device capable of interconnecting to the Internet including a web-based phone, PDA, or other web-based connectable equipment.

System 100 also includes point-of-sale (POS) terminals 118, which may be connected to client systems 114 and may be connected to server system 112. POS terminals 118 are interconnected to the Internet through many interfaces including a network, such as a local area network (LAN) or a wide area network (WAN), dial-in-connections, cable modems, wireless modems, and special high-speed ISDN lines. POS terminals 118 could be any device capable of interconnecting to the Internet and including an input device capable of reading information from a consumer's financial transaction card.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities conducted over the processing network including data relating to merchants, account holders or customers, issuers, acquirers, purchases made. Database 120 may also store account data including at least one of a cardholder name, a cardholder address, an account number, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data. Database 120 may store security information, encryption keys and registration information for providing application security services and for other processing according to the method described in the present disclosure.

In the example embodiment, one of client systems 114 may be associated with acquirer bank 26 (shown in FIG. 1) while another one of client systems 114 may be associated with issuer bank 30 (shown in FIG. 1). POS terminal 118 may be associated with a participating merchant 24 (shown in FIG. 1) or may be a computer system and/or mobile system used by a cardholder making an on-line purchase or payment. Server system 112 may be associated with interchange network 28. In the exemplary embodiment, server system 112 is associated with a network interchange, such as interchange network 28, and may be referred to as an interchange computer system. Server system 112 may be used for processing transaction data. In addition, client systems 114 and/or POS 118 may include a computer system associated with at least one of an online bank, a bill payment outsourcer, an acquirer bank, an acquirer processor, an issuer bank associated with a transaction card, an issuer processor, a remote payment system, a biller, and/or an end-user, either an external end-user requesting security services or an in-house end-user requesting security services. Accordingly, each party involved in processing transaction data are associated with a computer system shown in system 100 such that the parties can communicate with one another as described herein.

Using the interchange network, the computers of the merchant bank or the merchant processor will communicate with the computers of the issuer bank to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account is decreased. Normally, a charge is not posted immediately to a consumer's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

For debit card transactions, when a request for a PIN authorization is approved by the issuer, the consumer's account is decreased. Normally, a charge is posted immediately to a consumer's account. The bankcard association then transmits the approval to the acquiring processor for distribution of goods/services, or information or cash in the case of an ATM.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which is settled as a group.

The financial transaction cards or payment cards discussed herein may include credit cards, debit cards, a charge card, a membership card, a promotional card, prepaid cards, and gift cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), key fobs, or other devices, etc.

Figure 3:
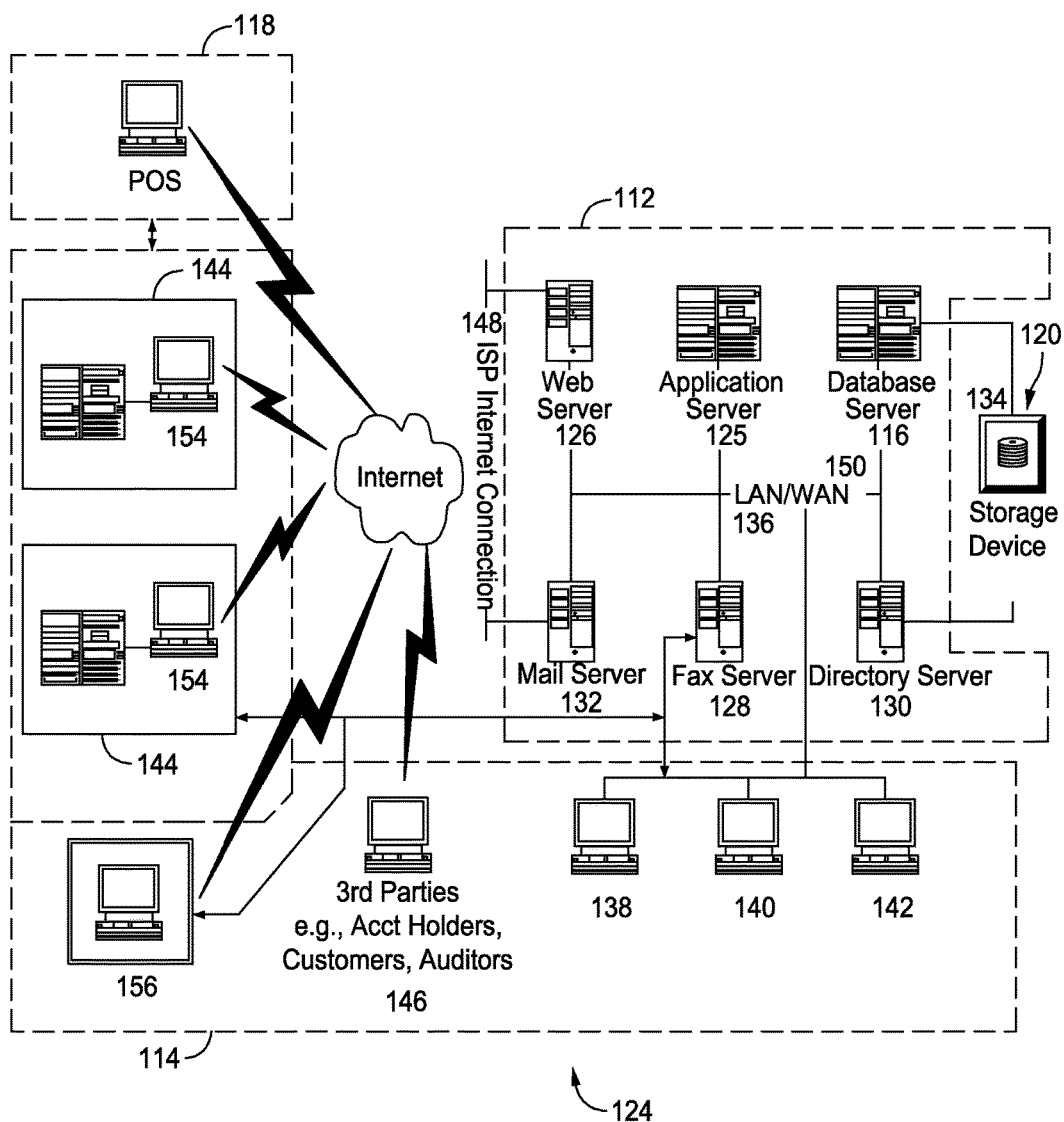

FIG. 3 is an expanded block diagram of an exemplary embodiment of a server architecture of a processing system 124 including other computer devices in accordance with one embodiment of the present invention. Components in system 124, identical to components of system 100 (shown in FIG. 2), are identified in FIG. 3 using the same reference numerals as used in FIG. 2. System 124 includes server system 112, client systems 114, and POS terminals 118. Server system 112 further includes database server 116, an application server 125, a web server 126, a fax server 128, a directory server 130, and a mail server 132. A storage device 134 is coupled to database server 116 and directory server 130. Servers 116, 125, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, consumers, merchants, acquirers, issuers, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 124. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 4:
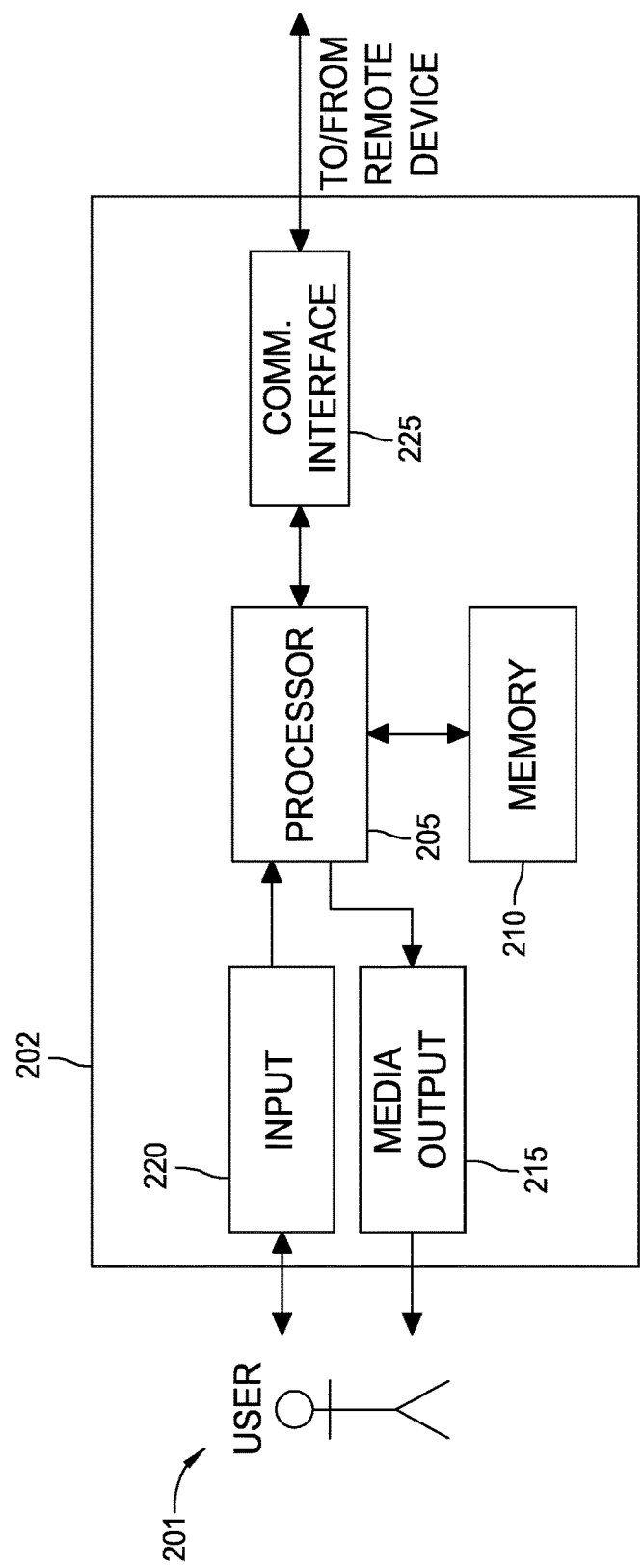

FIG. 4 illustrates an exemplary configuration of a user system 202 operated by a user 201, such as cardholder 22 (shown in FIG. 1). User system 202 may include, but is not limited to, client systems 114, 138, 140, and 142, POS terminal 118, workstation 154, and manager workstation 156. In the exemplary embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
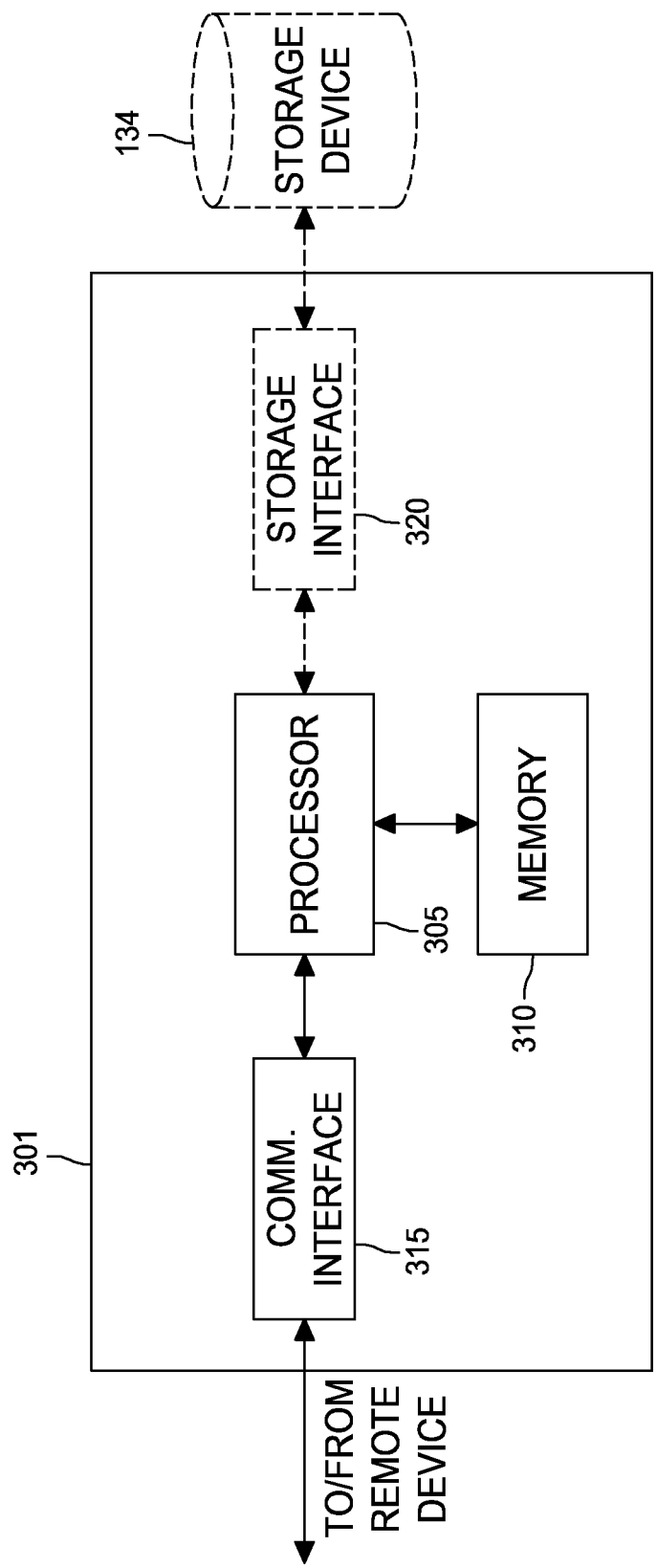

FIG. 5 illustrates an exemplary configuration of a server system 301 such as server system 112 (shown in FIGS. 2 and 3). Server system 301 may include, but is not limited to, database server 116, application server 125, web server 126, fax server 128, directory server 130, and mail server 132.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc).

Processor 305 is operatively coupled to a communication interface 315 such that server system 301 is capable of communicating with a remote device such as a user system or another server system 301. For example, communication interface 315 may receive requests from user system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
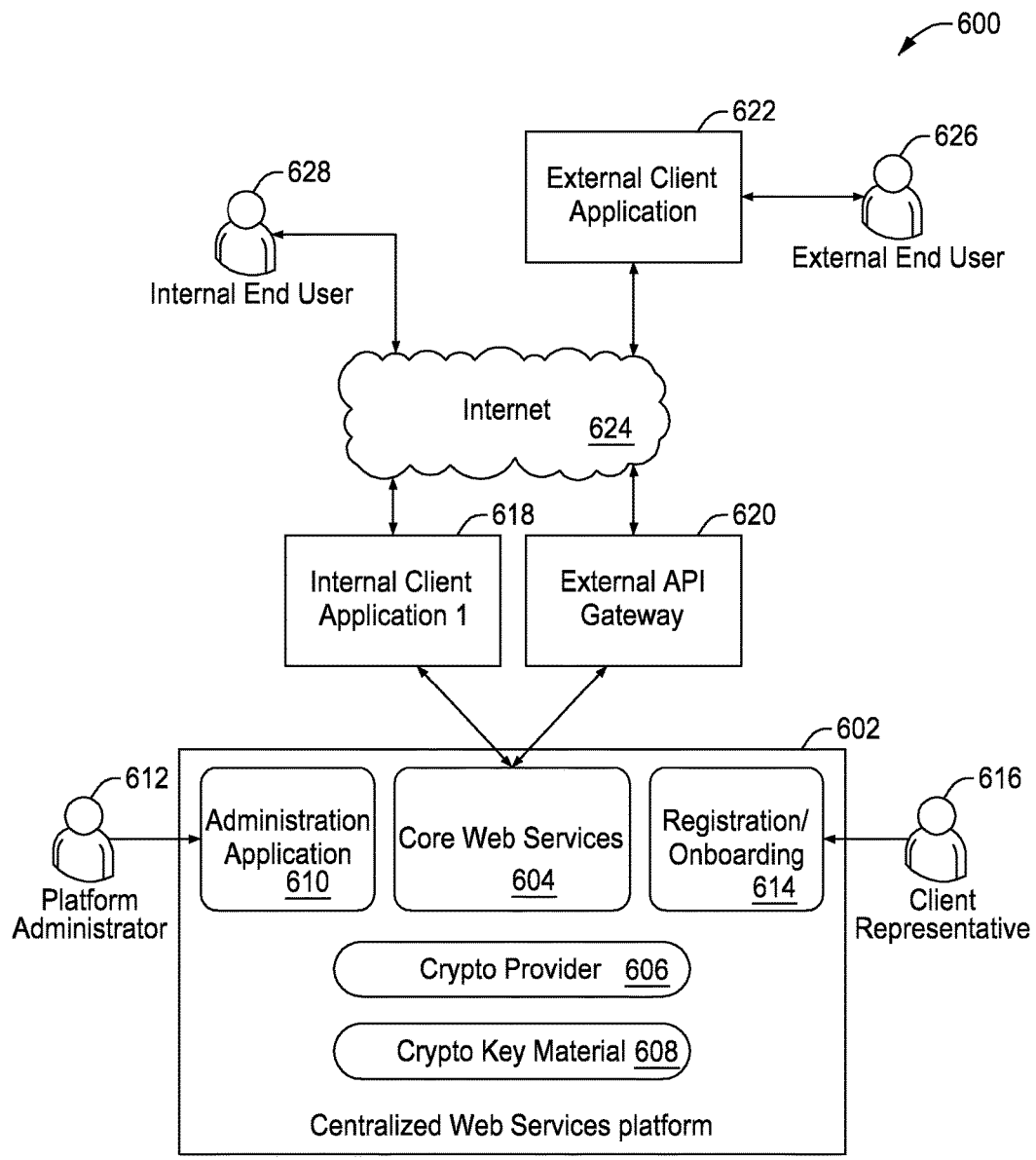

FIG. 6 illustrates a data flow diagram of a security services system 600 in accordance with an exemplary embodiment of the present disclosure. In the exemplary embodiment, security services system 600 includes a centralized web services platform 602. Centralized web services platform 602 includes three main sub-systems, a service API, referred to as core web services module 604, a crypto provider 606, and a crypto key material module 608. Core web services module 604 includes associated code implemented at the web tier. Core web services module 604 exposes a public API providing cryptographic features and functionality and manages the interactions between clients and crypto provider 606. In the exemplary embodiment, internal client application 618 is implemented via SOAP over HTTP(S).

Centralized web services platform 602 also includes an administration application 610, which is managed by a platform administrator 612 and a registration module 614 managed by a client representative 616.

Centralized web services platform 602 is configured to interface with an internal client application 618 and an external API gateway 620 through core web services module 604. External API gateway 620 is used to interface with an external client application 622 through a network 624, such as, but not limited to, the Internet. External API gateway 620 permits an external client application 622 to access centralized web services platform 602 and specifically core web services module 604 to provide various services. Typically, security and key management are the responsibility of each external client application 622. However, in embodiments of the present disclosure, security services may be provided by crypto provider 606 as a paid service. Accordingly, an API developer that produces one of many external client applications 622 that each may be used by multiple end-users simultaneously may wish to have centralized web services platform 602 provide required security services through crypto provider 606.

Internal client application 618 is used to interface with an internal end-user 628 through network 624. Internal client application 618 is able to access centralized web services platform 602 and specifically core web services module 604 to provide various services. Security and key management services may be provided by crypto provider 606 and crypto key material module 608. Accordingly, internal client application 618 may request to have centralized web services platform 602 provide required security services through crypto provider 606.

During operation, internal client application 618 may be a website or web application that is closely controlled by the same entity that also controls centralized web services platform 602, hence the reference to "internal client" application. Internal client application 618 may be a website set up to have a user identity and password and may capture personal information, such as, but not limited to end-users' credit card information in for example, a wallet type application. End-user 628 interacts with the website through the Internet entering such information as name, address, etc. during a registration process and also possibly entering more sensitive data such as credit card data into the wallet application. Unbeknownst to the end-user, internal client application 618 captures that data in plain text or not encrypted. Internal client application 618 then transmits the collected data to core web services module 604, which manages calls to crypto provider 606, and crypto key material module 608 for encryption of the captured data and transmitting the encrypted data back to internal client application 618, which then stores the encrypted data until needed, at which time internal client application 618 transmits the encrypted data back to core web services module 604 for decryption by crypto provider 606, and crypto key material module 608. In this way internal client application 618 does not need to manage security of the data, but rather can depend on core web services module 604, crypto provider 606, and crypto key material module 608 for those services.

Internal client application 618 makes as many service calls to core web services module 604 as needed to perform the functions of the application and business flows to support the end user 628 experience.

External client application 622 operates similarly as internal client application 618 with the exception that the application may originate as a product of a third-party developer. A bank partner of the entity the controls core web services module 604 may produce their own wallet type application, but the partner may not want to perform all the security services themselves. The partner could then register to use the security services of core web services module 604 for a fee and the interaction between end-user 626 and core web services module 604 would be facilitated using external client application 622 and external API gateway 620.

In the case where the bank partner is capturing the same or similar information, that information would come to core web services module 604 over the internet through external API gateway 620 and be transmitted to core web services module 604 to perform those encryption or other security functions. External client application 622 receives the same kind of data back as did internal client application 618.

Figure 7:
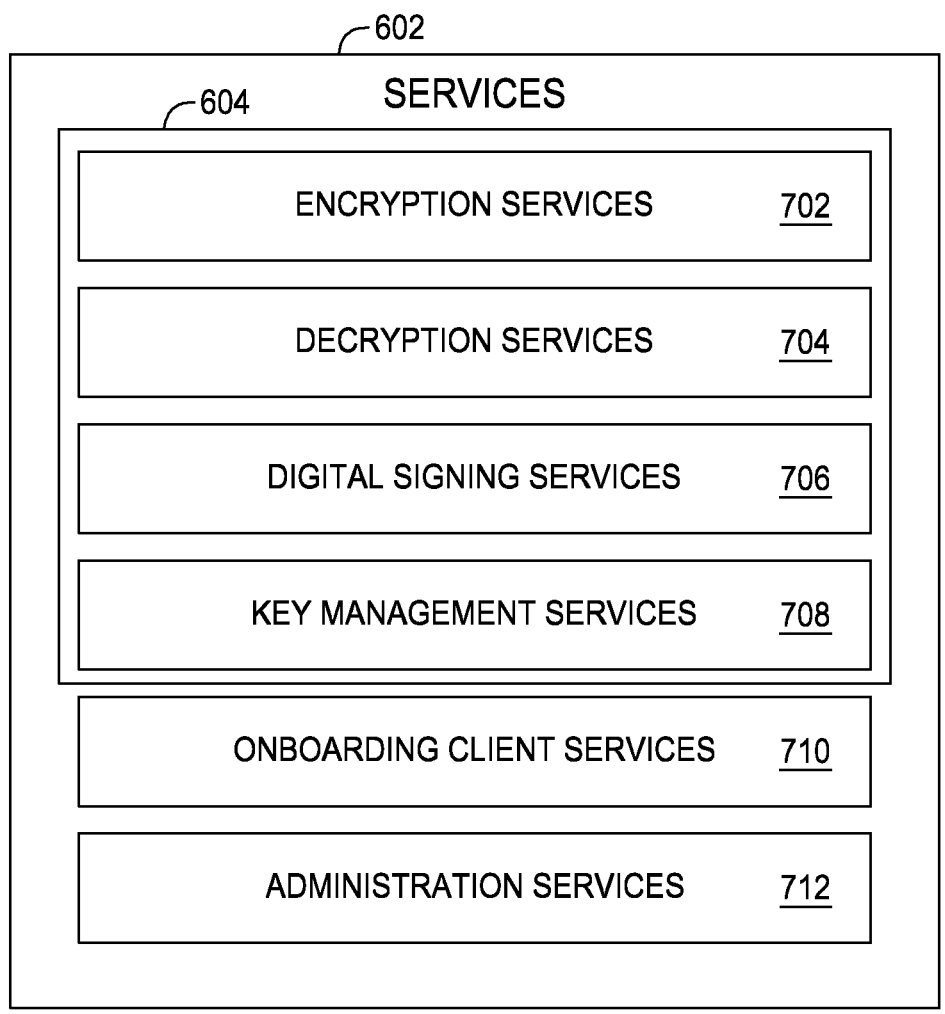

FIG. 7 is a block diagram of centralized web services platform 602 in accordance with an exemplary embodiment of the present disclosure. In the exemplary embodiment, centralized web services platform 602 includes an encryption services module 702, a decryption services module 704, a digital signing services module 706, a key management services module 708, an onboarding client services module 710, and an administration services module 712.

In the exemplary embodiment, encryption services module 702, decryption services module 704, digital signing services module 706, and key management services module 708 are a part of core web services module 604. Onboarding client services module 710, and administration services module 712 are interface with the modules of core web services module 604. In various other embodiments, encryption services module 702, decryption services module 704, digital signing services module 706, key management services module 708, onboarding client services module 710, and administration services module 712 are grouped differently.

Digital signing services module 706 manages any type of data that is passed into centralized web services platform 602 to sign, for example, a document, a fragment of XML, text-based data, or any other data that can be digitally signed.

Encryption services module 702, decryption services module 704 use algorithms that are publicly available, provided through a third party crypto provider, or programmed in-house to provide security to the data.

Onboarding client services module 710, and administration services module 712 provide housekeeping services to centralized web services platform 602 and manage the intake and registration of client applications.

Key management services module 708, provides handling of the keys that core web services module 604 utilizes to provide the functionality through the API, for example, provisioning of keys, de-provisioning of keys, and potentially key derivation. Key management services module 708 also associates an encryption key to a particular client, so that each client has a unique key and manages that relationship so that the client is the only one that will ever have access to that particular key.

Figure 8:
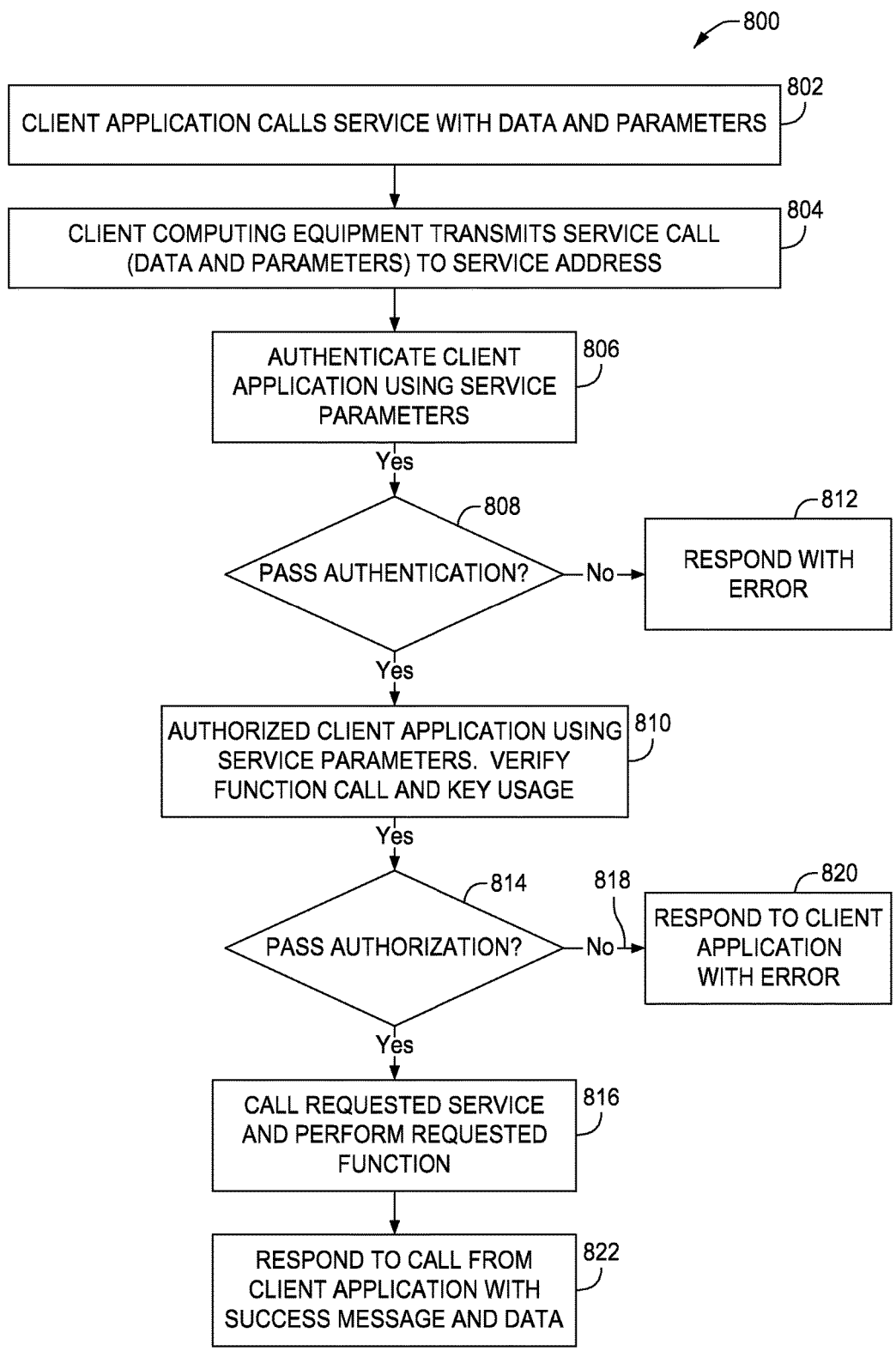

FIG. 8 is a flow diagram of a method 800 of handling a call for services from centralized web services platform 602 by an application in accordance with an exemplary embodiment of the present disclosure. In the exemplary embodiment, a client application calls 802 for service with data and parameters. In the case of for example, encryption services, the data may be the information to be encrypted and the parameters may relate to the type of encryption or the encryption strength. The client computing equipment transmits 804 the service call (data and parameters) to a service address. Method 800 also includes authenticating 806 the client application using the service parameters and if the authentication passes 808, method 300 authorizes 810 the client application using the service parameters, and verifies the function call and key usage. If authentication fails, an error message is generated 812. If the authorization passes 814, the requested service is called 816 and the requested function is performed. If the authorization fails 818, the client application is responded 820 to with an error. Method 800 then responds 822 to the call from the client application with a success message and the resultant data.

Figure 9:
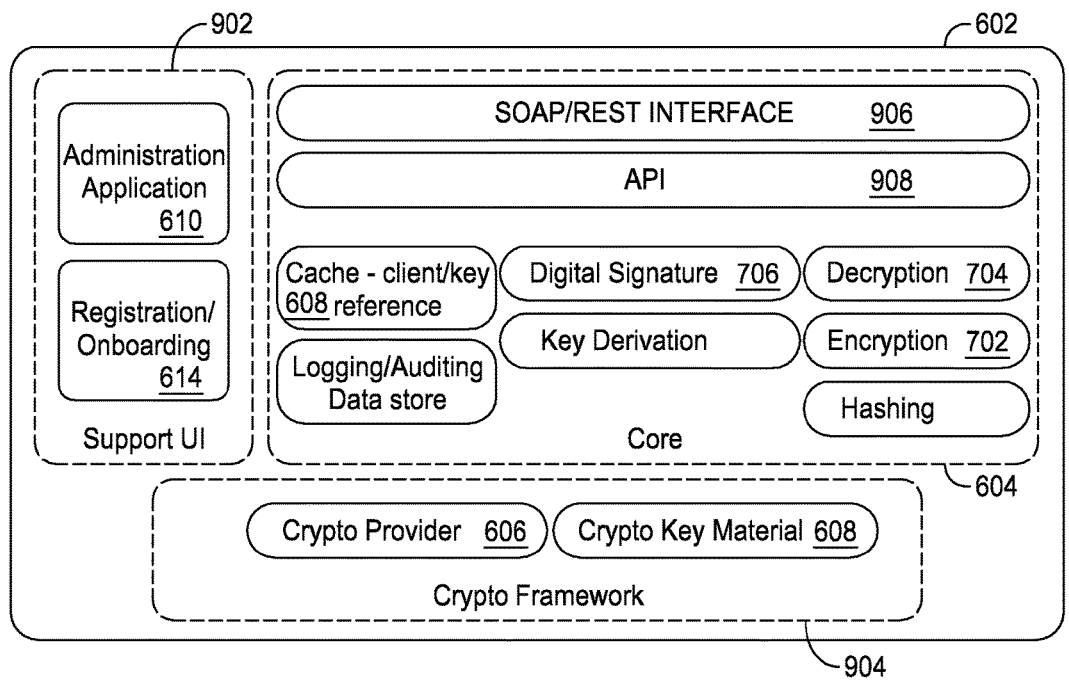

FIG. 9 is a block diagram of centralized web services platform 602 illustrating platform components in accordance with an exemplary embodiment of the present disclosure. In the exemplary embodiment, centralized web services platform 602 includes core web services module 604, a support user interface 902, and a crypto framework 904.

Core web services module 604 includes a SOAP/REST interface 906, which receives information using a communications protocol. For example, in the exemplary embodiment, the REpresentational State Transfer (REST) protocol is employed, which allows client applications 618,622 to call a web service API 908 using a single universal resource locator (URL) and pass in various parameters in that URL. Requests sent to web services API 908 can include for example, data from a client application 618, 620 along with the type or types of resources end-users 626, 628 is requesting and/or parameters that will influence how the data is processed.

An example of another communication protocol includes the Simple Object Access Protocol (SOAP XML). For information received by centralized web services platform 602 using the REST protocol to be communicated to external client application 622, a protocol translation must occur (e.g., a REST to SOAP conversion is performed), such translation may be handled by SOAP/REST interface 906.

The methods and systems described herein may be implemented using computer programming or engineering techniques including computer software, firmware, hardware or any combination or subset thereof, wherein the technical effect may include at least one of: (a) receiving a message defining an API service request comprising at least a parameter portion and a payload portion, (b) determining at the gateway system an identity of an application transmitting the received message using identity information that has been established within the service provider computer system, (c) providing, by a services platform, at least one of encryption services and decryption services for data contained in the payload portion using the parameters received in the parameter portion, (d) managing key material for security of the data, and (e) transmitting the encrypted data back to the calling application.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, smartphones, personal digital assistants (PDAs), key fobs, and/or computers. Each type of transactions card can be used as a method of payment for performing a transaction.

In one embodiment, a computer program is provided, and the program is embodied on a computer readable medium. In an exemplary embodiment, the system is executed on a single computer system, without requiring a connection to a sever computer. In a further exemplary embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processors 205, 305, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-discussed embodiments of the invention may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

The above-described embodiments of a method and system of providing security services to applications as a revenue-based service provides a cost-effective and reliable means for providing computing partners with an alternative to managing security of their websites. More specifically, the methods and systems described herein facilitate receiving personal information from consumers and protecting that information robustly using a service provider system that bundles a plurality of security services and manages those services for the computing partner. As a result, the methods and systems described herein facilitate providing bundled services to subscribers in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-based method for providing remote cryptographic services to a client application in a service call to a service system in a service provider computer system, said method comprising:

storing identity information for a plurality of client applications;

generating, by a key management services module associated with the service provider computer system, an encryption key, wherein the encryption key is associated with at least one client application of the plurality of client applications, wherein the encryption key is used by a cryptography provider to encrypt application data;

exposing a cryptography service provider application programming interface (API) to the plurality of client applications, wherein the cryptography service provider API is configured to i) deliver encryption requests and decryption requests to the cryptography provider, and ii) deliver encrypted data and decrypted data to the plurality of client applications;

receiving, via the cryptography service provider API, an encryption request from the at least one client application, wherein the encryption request includes data for an end-user of the at least one client application, wherein the encryption request includes at least one encryption parameter specified by the at least one client application for use in encrypting the data, and wherein the at least one encryption parameter identifies an encryption type and an encryption strength;

encrypting the data using the generated encryption key, the encryption type specified by the at least one client application, and the encryption strength specified by the at least one client application;

transmitting, via the cryptography service provider API, the encrypted data back to the at least one client application that requested the encryption and without transmitting the encryption key to the at least one client application;

storing, on the cryptographic service system, the generated encryption key, the encryption type and encryption strength specified by the at least one client application, and an association between the key and the at least one client application without storing the encrypted data on the cryptographic service system;

receiving, from the at least one client application that originally requested the encryption of the encrypted data, a decryption request comprising at least a parameter portion and the encrypted data, wherein the parameter portion defines the encryption type associated with the encrypted data and the encryption strength associated with the encrypted data;

determining an identity of the at least one client application transmitting the received message based on the identity information and the parameter portion;

locating, from storage on the cryptographic service system, the generated encryption key, the encryption type, and the encryption strength based on the determined identity of the at least one client application;

decrypting the encrypted data using the generated encryption key, the encryption type, and the encryption strength; and transmitting the decrypted data back to the at least one client application.

2. The computer-based method of claim 1, further comprising selecting at least one encryption algorithm from a library of encryption algorithms to apply to the data based on the parameter portion.

3. The computer-based method of claim 2, further comprising:

storing the generated encryption key and the association in a cryptographic key material module.

4. The computer-based method of claim 2, further comprising selecting a decryption algorithm from a library of decryption algorithms corresponding to the selected encryption algorithm to apply to the received encrypted data based on the parameter portion.

5. The computer-based method of claim 1, wherein receiving the encryption request further comprises receiving the encryption request from at least one of an application external to the service provider computer system and an application internal to the service provider computer system, and wherein receiving the decryption request further comprises receiving the decryption request from at least one of an application external to the service provider computer system and an application internal to the service provider computer system.

6. The computer-based method of claim 1, wherein receiving the encryption request comprises receiving a message defining an application programming interface (API) service request from a website associated with the service provider computer system.

7. The computer-based method of claim 1, wherein receiving the encryption request comprises receiving a message defining an application programming interface (API) service request from an application not associated with the service provider computer system.

8. A computer system for providing remote cryptographic services, the computer system comprising a memory device and a processor in communication with the memory device, the computer system programmed to:

store identity information for a plurality of client applications;

generate, by a key management services module associated with the service provider computer system, an encryption key, wherein the encryption key is associated with at least one client application of the plurality of client applications, wherein the encryption key is used by a cryptography provider to encrypt application data;

expose a cryptography service provider application programming interface (API) to the plurality of client applications, wherein the cryptography service provider API is configured to i) deliver encryption requests and decryption requests to the cryptography provider, and ii) deliver encrypted data and decrypted data to the plurality of client applications;

receive, via the cryptography service provider API, an encryption request from the at least one client application, wherein the encryption request includes data for an end-user of the at least one client application, wherein the encryption request includes at least one encryption parameter specified by the at least one client application for use in encrypting the data, and wherein the at least one encryption parameter identifies an encryption type and an encryption strength;

encrypt the data using the generated encryption key, the encryption type specified by the at least one client application, and the encryption strength specified by the at least one client application;

transmit, via the cryptography service provider API, the encrypted data back to the at least one client application that requested the encryption and without transmitting the encryption key to the at least one client application;

store, on the memory device, the generated encryption key, the encryption type and encryption strength specified by the at least one client application, and an association between the key and the at least one client application without storing the encrypted data on the memory device;

receive from the at least one client application that originally requested the encryption of the encrypted data, a decryption request comprising at least a parameter portion and the encrypted data, wherein the parameter portion defines the encryption type associated with the encrypted data and the encryption strength associated with the encrypted data;

determine an identity of the at least one client application transmitting the received message based on the identity information and the parameter portion;

locate, from storage on the memory device, the generated encryption key, the encryption type, and the encryption strength based on the determined identity of the at least one client application;

decrypt the encrypted data using the generated encryption key, the encryption type, and the encryption strength; and transmit the decrypted data back to the at least one client application.

9. The computer system of claim 8, wherein said computer system is programmed to select at least one encryption algorithm from a library of encryption algorithms to apply to the data based on the parameter portion.

10. The computer system of claim 9, wherein said computer system is programmed to:
store the generated encryption key and the association in a cryptographic key material module.

11. The computer system of claim 9, wherein said computer system is programmed to select a decryption algorithm from a library of decryption algorithms corresponding to the selected encryption algorithm to apply to the received encrypted data based on the parameter portion.

12. The computer system of claim 8, wherein said computer system is programmed to receive the encryption request from at least one of an application external to the service provider computer system and an application internal to the service provider computer system.

13. The computer system of claim 8, wherein said computer system is programmed to receive the encryption request from a website associated with the service provider computer system.

14. The computer system of claim 8, wherein said computer system is programmed to receive the encryption request from an application not associated with the service provider computer system.

15. One or more non-transitory computer-readable storage media having computer-executable instructions embodied thereon, wherein when executed by at least one processor, the computer-executable instructions cause the processor to:

store identity information for a plurality of client applications;

generate, by a key management services module associated with the service provider computer system, an encryption key, wherein the encryption key is associated with at least one client application of the plurality of client applications, wherein the encryption key is used by a cryptography provider to encrypt application data;

expose a cryptography service provider application programming interface (API) to the plurality of client applications, wherein the cryptography service provider API is configured to i) deliver encryption requests and decryption requests to the cryptography provider, and ii) deliver encrypted data and decrypted data to the plurality of client applications;

receive, via the cryptography service provider API, an encryption request from the at least one client application, wherein the encryption request includes data for an end-user of the at least one client application, wherein the encryption request includes at least one encryption parameter specified by the at least one client application for use in encrypting the data, and wherein the at least one encryption parameter identifies an encryption type and an encryption strength;

encrypt the data using the generated encryption key, the encryption type specified by the at least one client application, and the encryption strength specified by the at least one client application;

transmit, via the cryptography service provider API, the encrypted data back to the at least one client application that requested the encryption and without transmitting the encryption key to the at least one client application;

store, on a memory device of the cryptography service provider, the generated encryption key, the encryption type and encryption strength specified by the at least one client application, and an association between the key and the at least one client application without storing the encrypted data on the memory device;

receive from the at least one client application that originally requested the encryption of the encrypted data, a decryption request comprising at least a parameter portion and the encrypted data, wherein the parameter portion defines the encryption type associated with the encrypted data and the encryption strength associated with the encrypted data;

determine an identity of the at least one client application transmitting the received message based on the identity information and the parameter portion;

locate, from storage on the memory device, the generated encryption key, the encryption type, and the encryption strength based on the determined identity of the at least one client application;

decrypt the encrypted data using the generated encryption key, the encryption type, and the encryption strength; and transmit the decrypted data back to the at least one client application.

16. The computer-readable storage media of claim 15, wherein the computer-executable instructions further cause the processor to select at least one encryption algorithm from a library of encryption algorithms to apply to the data based on the parameter portion.

17. The computer-readable storage media of claim 16, wherein the computer-executable instructions further cause the processor to:

store the generated encryption key and the association in a cryptographic key material module.

18. The computer system of claim 16, wherein said computer system is programmed to select a decryption algorithm from a library of decryption algorithms corresponding to the selected encryption algorithm to apply to the received encrypted data based on the parameter portion.

19. The computer-readable storage media of claim 15, wherein the computer-executable instructions further cause the processor to receive the encryption request from at least one of an application external to the service provider computer system and an application internal to the service provider computer system.

20. The computer-readable storage media of claim 15, wherein the computer-executable instructions further cause the processor to receive the encryption request from a website associated with the service provider computer system.

* * * * *